United States Patent [19]

Hanna et al.

[11] Patent Number: 5,058,042

[45] Date of Patent: Oct. 15, 1991

[54] METHOD FOR EMPLOYING A HIERARCHICAL DISPLAY LIST IN GLOBAL RENDERING

[75] Inventors: Samir L. Hanna; Louise M. Watson; John R. Wallace, all of Ithaca; Kells A. Elmquist, Lansing; Eric A. Haines, Ithaca, all of N.Y.; Kent M. Montgomery, Fort Collins, Colo.

[73] Assignee: Hewlett-Packard Company, Palo Alto, Calif.

[21] Appl. No.: 332,748

[22] Filed: Apr. 3, 1989

[51] Int. Cl.$^5$ .............................................. G06F 15/72
[52] U.S. Cl. .................................................... 364/522
[58] Field of Search ................................ 364/521, 522

[56] References Cited

U.S. PATENT DOCUMENTS

| | | | |
|---|---|---|---|
| 4,625,289 | 11/1986 | Rockwood | 364/522 |
| 4,649,498 | 3/1987 | Kedem et al. | 364/518 |
| 4,807,158 | 2/1989 | Blanton et al. | 364/521 |
| 4,862,392 | 8/1989 | Steiner | 364/522 |
| 4,945,500 | 7/1990 | Deering | 364/522 |
| 4,961,153 | 10/1990 | Fredrickson et al. | 364/521 |

OTHER PUBLICATIONS

Fujimoto, Akira, "Turbo Beam Tracing—A Physically Accurate Lighting Simulation Environment", *Knowledge Based Image Computing Systems*, pp. 1-5, May 20, 1988.

Maxwell, Gregory M. et al., "Calculations of the Radiation Configuration Factor Using Ray Casting", *Computer Aided Design*, vol. 18, No. 7, pp. 371-379, Sep. 1986.

Arvo, James, "Backward Ray Tracing", *Apollo Computer, Inc.*, pp. 1-7, Chelmsford, MA.

Cook, Robert L. et al., "Distributed Ray Tracing", *Computer Graphics*, vol. 18, No. 3, pp. 137-145, Jul. 1984.

Chattopadhyay, Sudeb et al., "Bi-Directional Ray Tracing", *Computer Graphics 1987*, Proceedings of CG International '87, pp. 335-343.

Cohen, Michael F. et al., "An Efficient Radiosity Approach For Realistic Images Synthesis", *IEEE CG & A*, pp. 26-35, Mar. 1986.

Cohen, Michael F. et al., "A Progressive Refinement Approach to Fast Radiosity Image Generation", *Computer Graphics*, vol. 22, No. 4, pp. 75-84, Aug. 1988.

Baum, Daniel R. et al., "The Back-Buffer Algorithm: An Extension of the Radiosity Method to Dynamic Environments", *The Visual Computer*, No. 2, pp. 298-306, 1986.

Greenberg, Donald P. et al., "Radiosity: A Method For Computing Global Illumination", *The Visual Computer*, No. 2, pp. 291-297, 1986.

Cohen, Michael F. et al., "The Hemi-Cube A Radiosity Solution For Complex Environments", *Computer Graphics*, vol. 19, No. 3, pp. 31-40, Jul. 1985.

Goral, Cindy M. et al., "Modeling the Interaction of Light Between Diffuse Surfaces", *Computer Graphics*, vol. 18, No. 3, pp. 213-222, Jul. 1984.

(List continued on next page.)

*Primary Examiner*—Dale M. Shaw
*Assistant Examiner*—Mark K. Zimmerman
*Attorney, Agent, or Firm*—Guy J. Kelley

[57] ABSTRACT

A method for employing a hierarchical display list in global rendering comprises the steps of traversing the display list and extracting selected primitives and attributes. A bounding volume is defined for selected primitives, and data indicative of the selected primitives, attributes, and bounding volumes are stored in a global database. Global rendering may be performed by either ray tracing or radiosity based upon the data in the global database. In the event that global rendering is performed by radiosity, then a plurality of surface elements for each selected primitive is defined and also stored in the global data base. Shading attribute data for each of the surface elements is defined upon application of a radiosity rendering algorithm to the global database. An alternative display list may be defined from the global database, if desired.

18 Claims, 5 Drawing Sheets

OTHER PUBLICATIONS

Meyer, Gary W. et al., "An Experimental Evaluation of Computer Graphics Imagery", *ACM Transactions on Graphics*, vol. 5, No. 1, pp. 30–50, Jan. 1986.

Brock, Philip J. et al., "A Unified Interactive Geometric Modeler For Simulating Highly Complex Environments", *Cornell University Program of Computer Graphics*, pp. 316–329.

Haines, Eric A. et al., "The Light Buffer: A Shadow-Testing Accelerator", *IEEE CG & A*, pp. 6–11, Sep. 1986.

Immel, David S. et al., "A Radiosity Method For Non-Diffuse Environments", *ACM (Siggraphy '86 Proceedings)*, vol. 20, No. 4, pp. 133–142, Aug. 18–22, 1986.

Greenberg, Donald P., "Coons Award Lecture", *Communications of the ACM*, vol. 31, No. 2, pp. 123–129, Feb. 1988.

McLeod, Jonah, "HP Delivers Photo Realism on an Interactive System", *Electronics*, pp. 95–97, Mar. 17, 1988.

Barlow, Andrew, "The Quest For Realism in Computer Modeling", *Computer Graphics Review*, pp. 22–29, Feb. 1989.

FIG. 1
PRIOR ART
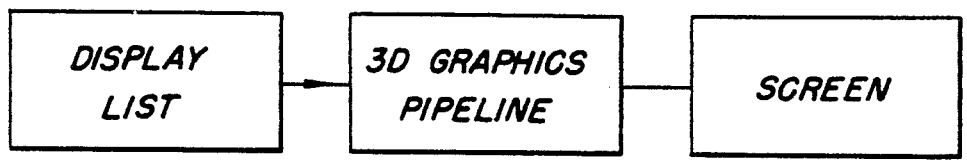
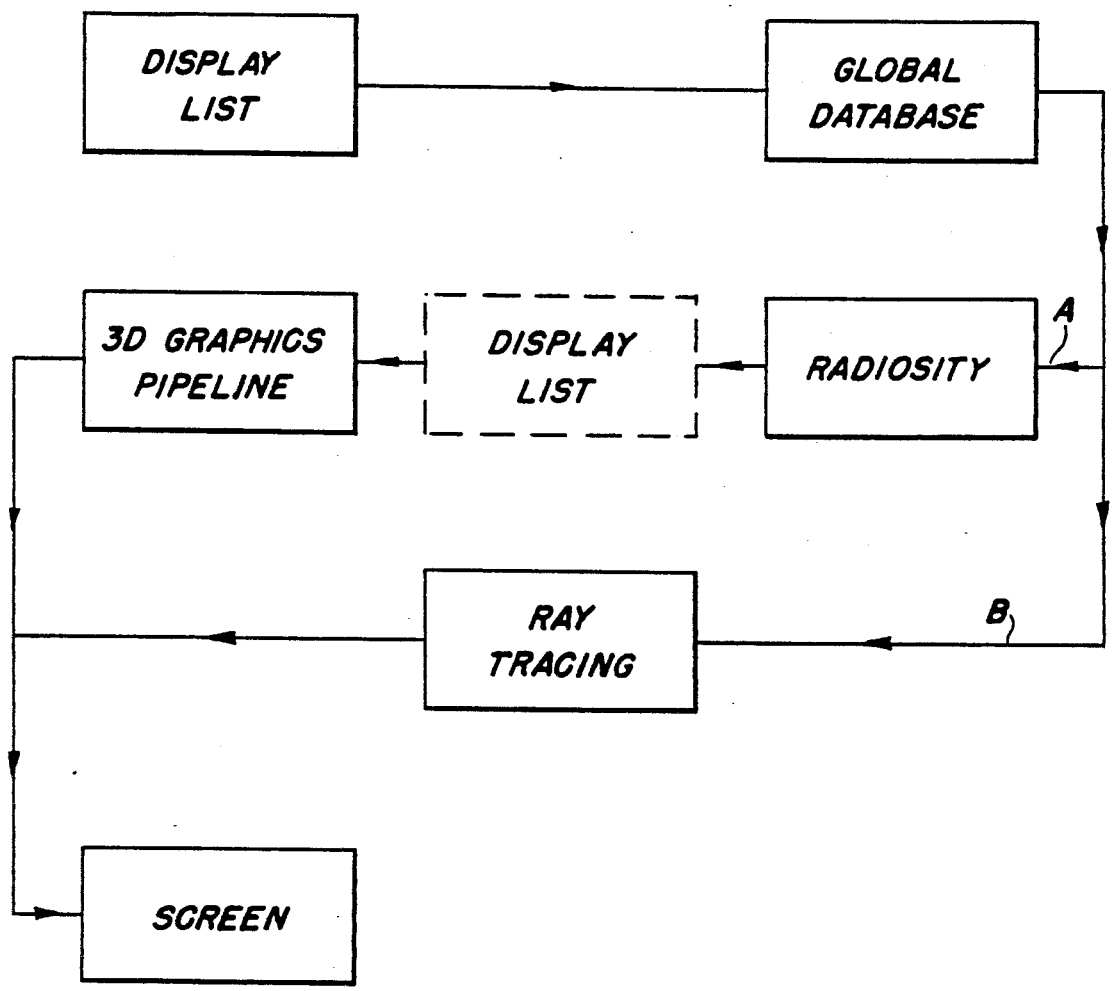
FIG. 2

FIG. 4A

RAY TRACING DATABASE

- CAMERA DESCRIPTION
- LIGHT SOURCE DESCRIPTIONS
- RECOGNIZED PRIMITIVES
- ATTRIBUTES
- BOUNDING VOLUMES

FIG. 4B

RADIOSITY DATABASE

- SAME CONTENTS AS RAY TRACING DATABASE
- SURFACE ELEMENTS

FIG. 4C

RADIOSITY DATABASE

- SAME CONTENTS AS RAY TRACING DATABASE
- SURFACE ELEMENTS
- SHADING ATTRIBUTES

METHOD FOR EMPLOYING A HIERARCHICAL DISPLAY LIST IN GLOBAL RENDERING

FIELD OF THE INVENTION

The present relates generally to the area of three dimensional graphics. More particularly, the present invention relates to a method for employing a hierarchical display list in global rendering, such as ray tracing and radiosity.

BACKGROUND OF THE INVENTION

Use of hierarchical display lists in three dimensional computer graphics programs is well known. A display list contains a sequence of graphics commands which identify data structures and operations through which graphics data are retained and manipulated. Thus, a display list provides a means of organizing and executing graphics commands.

Typically, a display list contains "segments." Segments contain an ordered list of primitives, attributes of primitives or control functions, as well as light source and view descriptions. As is well known in the art, a primitive is a graphics element that defines a two dimensional or three dimensional entity, such as a surface of an object to be rendered in a three dimensional scene, and an attribute is a graphics element that defines a characteristic of the entity to be rendered, e.g., color, reflectivity, etc.

The segments of a display list can be organized in a multilevel structure wherein segments "call" other segments. This multilevel structuring scheme allows a hierarchy or network of segments to be constructed that closely parallels the application models they represent, hence, the term "hierarchical display list."

During execution of the graphics program, the display list is "traversed" and the various graphics commands of the display list are entered into a so called "three dimensional graphics pipeline" and the model is displayed, e.g., on a CRT. One example of such a program is the Starbase Display List graphics program sold by Hewlett-Packard Company, Palo Alto, Calif. Display list programs such as Starbase, however, render scenes according to a local illumination technique and do not generate global shading as part of the rendering process. Hence the displayed images are frequently not realistic. A global rendering technique, such as ray tracing or radiosity, provides more realistic shading in the rendering process, but the sequential format of the graphics information in the display list does not readily lend itself to global rendering. Global illumination requires that all data defining a surface in the scene be available in order to determine the effect of irradiated light of one surface upon all other surfaces. In a display list, the effect of light irradiated from a surface defined later in the display list upon a surface defined earlier in the display list cannot easily be determined since the earlier information has already been entered into the three dimensional graphics pipeline.

The two most common techniques employed for global rendering are ray tracing and radiosity. Both techniques are well known in the art. The following publications, which are incorporated herein by reference, are illustrative: Goral, Cindy M. et al., "Modeling the Interaction of Light Between Diffuse Surfaces", *Computer Graphics*, vol. 18, no. 3, pp. 213-222 (July, 1984); Cohen, Michael F. et al., "The Hemi-Cube: A Radiosity Solution For Complex Environments", *SIGGRAPH Proceedings*, vol. 19, no. 3, pp. 31-40 (1985); Greenberg, Donald P. et al. "Radiosity: A Method For Computing Global Illumination", *The Visual Computer*, vol. 2, pp. 291-297 (1986); Cohen, Michael F. et al., "An Efficient Radiosity Approach For Realistic Image Synthesis", *IEEE CG&A*, pp. 26-35 (March, 1986); Cohen, Michael F. et al., "A Progressive Refinement Approach to Fast Radiosity Image Generation", *Computer Graphics*, vol. 22, no. 4, pp. 75-84 (August, 1988). See also the following publications, incorporated herein by reference, which describe various ray tracing techniques: Wittig, Turner, "An Improved Illumination Model for Shaded Display", *Communications of the ACM*, 32,6 June 1980, pp. 343-349; Cook, Robert L. et al., "Distributed Ray Tracing", *Computer Graphics*, vol. 18, no. 3, pp. 137-145 (July, 1984). For implementation, both techniques require additional information that may not be immediately available in the display list. Thus, in the case of ray tracing (and by extension radiosity approaches that use ray tracing), a so called "bounding volume" around each three dimensional surface in the scene is often defined in order to increase the efficiency of determining ray-object intersections. The process of defining a bounding volume around such a surface is well known in the art, but nonetheless, this information may not be immediately available in a display list since it is not required for rendering a scene by local illumination. Additionally, in the case of radiosity, the various surfaces must be subdivided into a plurality of smaller surface elements (usually polygons being defined by a plurality of vertices) in order to carry out the radiosity algorithm. Again, however, this information is not immediately available in the display list. In the prior art, global rendering has been performed using special purpose modelers, not display lists.

It is therefore desirable to provide a method that renders display lists suitable for use with a global rendering technique. Since ray tracing and radiosity have their own strengths and weaknesses, it is further desirable that such method be adaptable so that it can be employed with either one of the these rendering techniques. The present invention achieves these objectives.

SUMMARY OF THE INVENTION

A method according to the present invention comprises the step of first providing a hierarchical display list comprising data indicative of a plurality of primitives and attributes of primitives for a three dimensional rendering of a scene. The display list is traversed and, during traversal, only those primitives in the display list that correspond to three dimensional surfaces, along with the attributes in the display list associated with those primitives, are selected. Data indicative of the selected primitives and associated attributes are then stored in a "global database". Data indicative of light source and view descriptions of the scene are also taken from the display list during traversal and stored in the global database. During traversal, a bounding volume is defined around each selected primitive and data indicative of the bounding volumes are also stored in the global database. Thus, the global database will contain information in a form suitable for application of a global illumination technique, i.e., the effect of light irradiated from one surface upon all of the other surfaces can be determined.

According to the invention, a user may select at least one of two global rendering techniques, i.e., ray tracing or radiosity. If the user has selected ray tracing for global rendering, then no additional information need be stored in the global database and the scene may be rendered by application of any well known ray tracing algorithm to the database. If the user has selected radiosity for the rendering, then further operations are performed upon the data indicative of the selected primitives stored in the global database. The additional operations include defining a plurality of smaller surface elements for each selected primitive, in well known fashion, then storing data indicative of these surface elements in the global database. During radiosity rendering, shading attributes for each of the surface elements are determined and stored in the global database. Thereafter, a global rendering of the scene may be displayed based upon the data indicative of the surface elements and shading attributes.

In an optional embodiment of the invention, if radiosity rendering has been chosen, the user may elect to construct a second or "alternative" display list from the global database. The alternative display list preferably comprises the surface element data and corresponding shading attribute data, in display list format, in which form the shaded scene may be redisplayed in the most efficient manner. Such fast and efficient redisplay of shaded data provides the user with the ability to quickly view the shaded scene from a succession of different view points. In addition, attributes in the alternative display list may be changed. In other words, the user may modify the alternative display list directly and thereafter send the alternative display list directly to the graphics system for display without waiting for the completion of another radiosity rendering to the revised scene.

BRIEF DESCRIPTION OF THE DRAWINGS

FIG. 1 conceptually illustrates the methodology of a prior art three dimensional computer graphics program employing a display list.

FIG. 2 conceptually illustrates the methodology of the present invention applied to a prior art three dimensional computer graphics program employing a display list.

FIGS. 4A-4C broadly illustrate the contents of global databases formed in accordance with the practice of the present invention.

DETAILED DESCRIPTION OF THE INVENTION

FIG. 1 conceptually illustrates the methodology of a prior art three dimensional computer graphics program employing a display list, such as Starbase. Thus, as shown in FIG. 1, in such prior art system, as the display list is traversed, each graphics command encountered is sent through the three dimensional graphics pipeline of the graphics system, then to the screen (CRT) for display.

FIG. 2 conceptually illustrates the methodology of the present invention as applied to a prior art three dimensional computer graphics program employing a display list. As will be described in more detail below, the display list is traversed (without executing the graphics commands encountered) and selected primitives and associated attributes are extracted and copied into a global database. If rendering by ray tracing technique has been chosen (branch B of FIG. 2), then any well known ray tracing algorithm may be applied to the global database to provide a global rendering that may be displayed on a screen. However, if a radiosity technique has been selected (branch A), then additional data is defined and stored in the database (not shown in FIG. 2) and any well known radiosity algorithm is thereafter applied to the global database to provide a radiosity rendering. If desired, an alternative display list (display list') may be created for purposes to be explained herein after. The data from the global database is then passed to the three dimensional graphics pipeline of the graphics system for display on the screen.

Figure 3A:
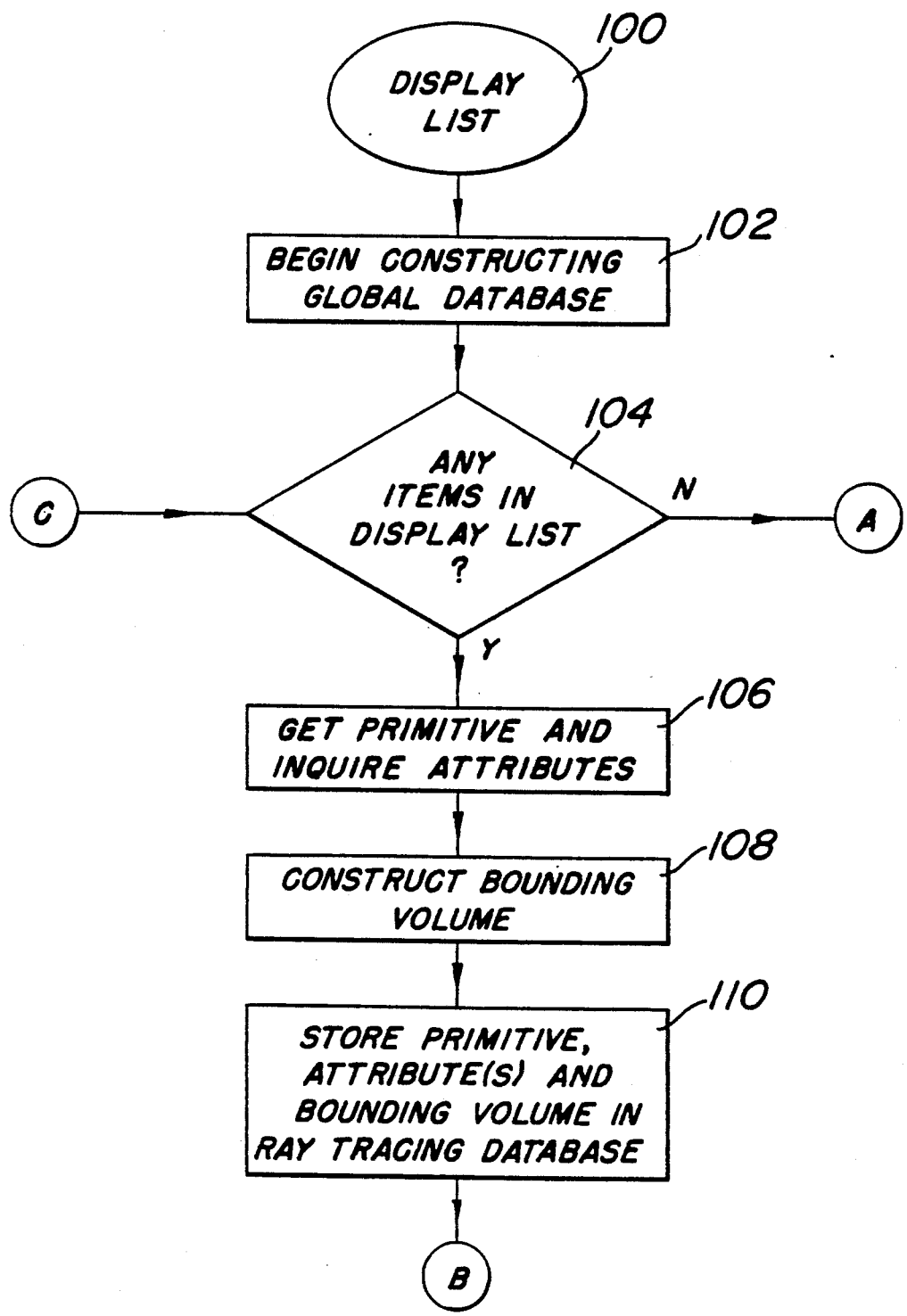
FIGS. 3A-3D are a flow chart illustrating the method of the present invention in greater detail.
Figure 3B:
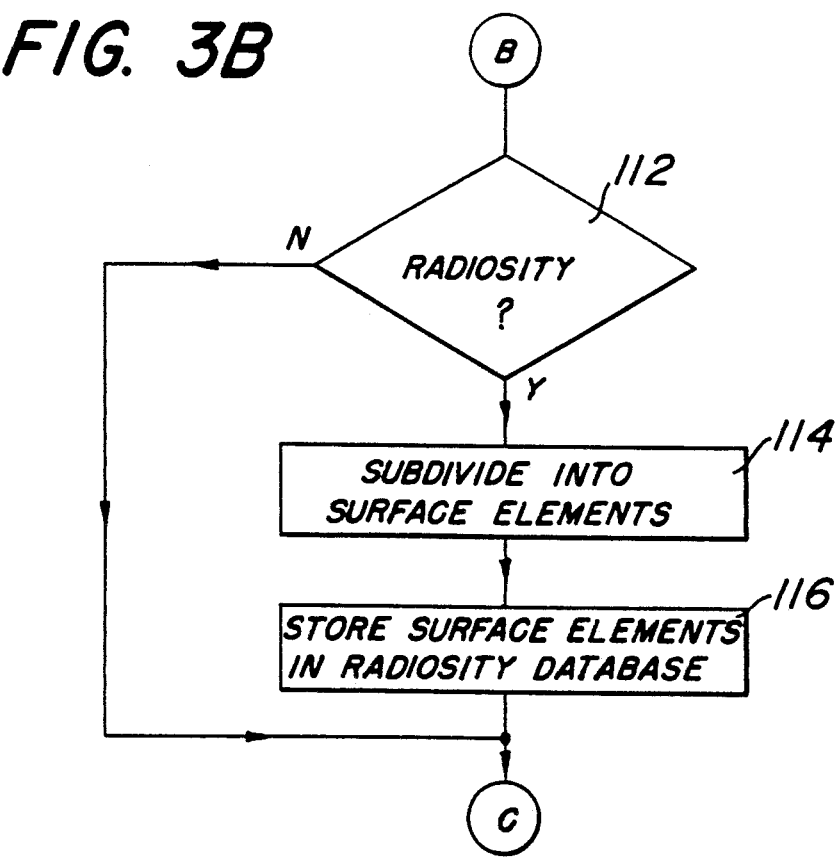
Figure 3D:
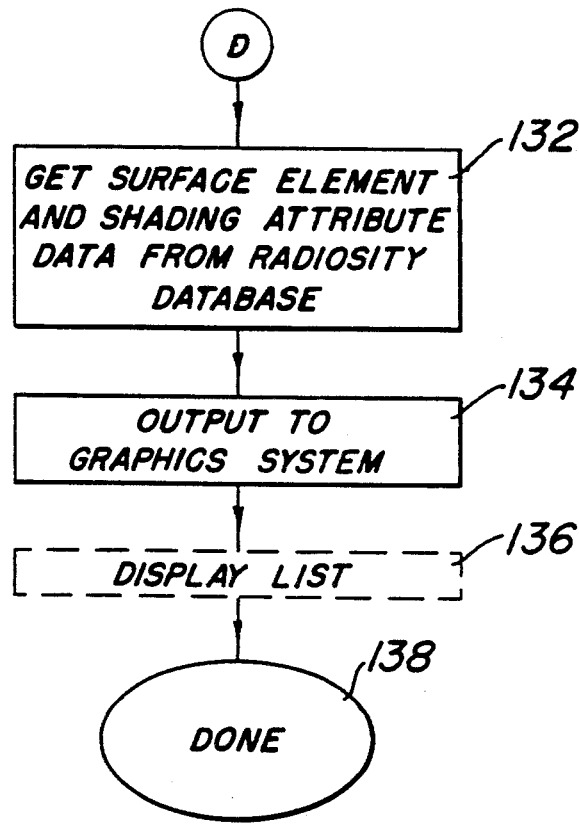
Figure 3C:
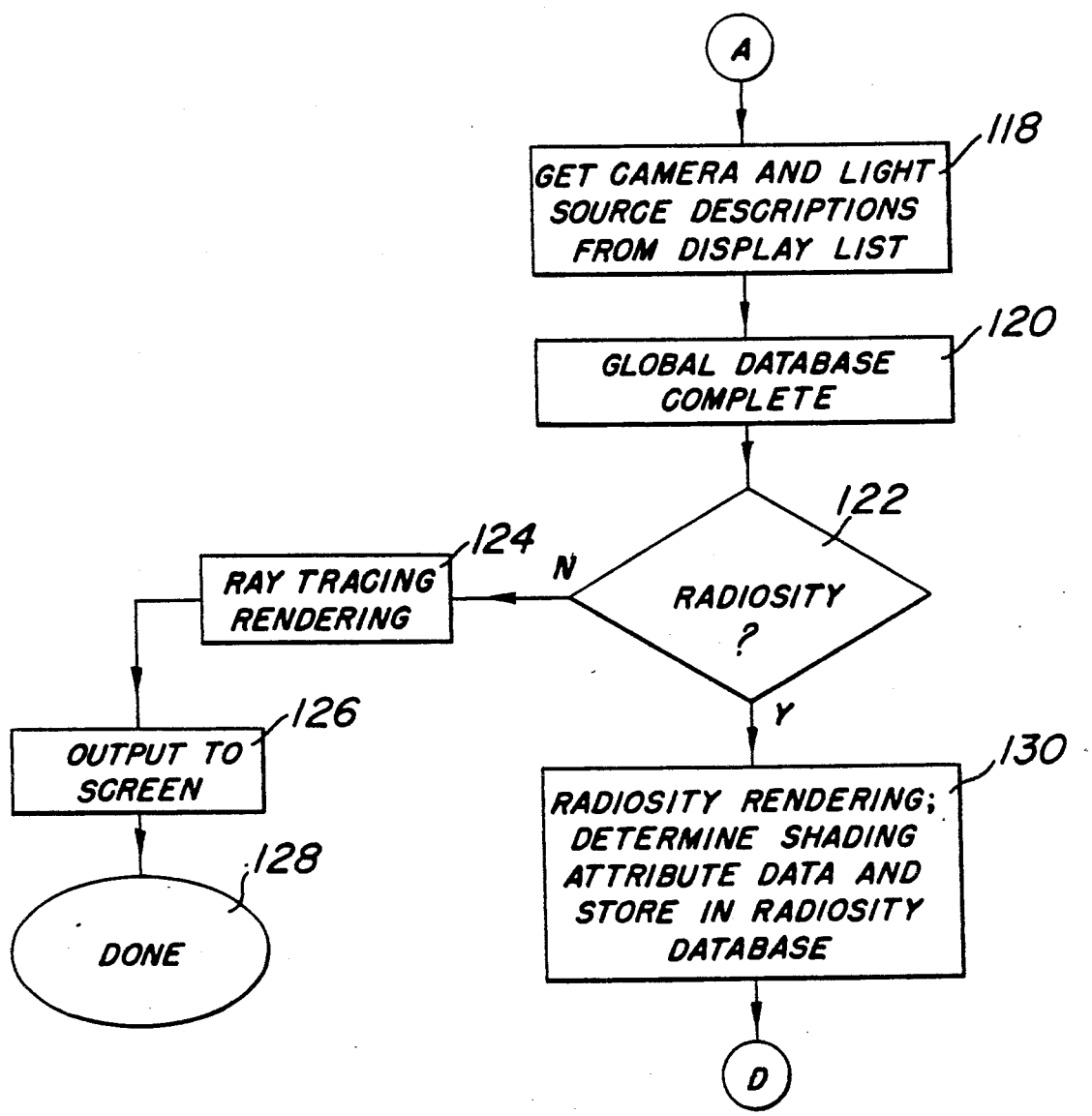

FIGS. 3A-3D illustrate the method of the present invention in greater detail. As illustrated at 100, a display list is either created or retrieved from memory. As illustrated at 102-116, the global database is thereafter constructed.

Steps 104-116 illustrate that the display list is traversed by stepping through each item and selecting only those primitives, and associated attributes of those primitives, that correspond to a three dimensional surface element. In the preferred practice of the invention, which is utilized in conjunction with the aforementioned Starbase graphics program, only the following primitives are selected during this process:

| | |
|---|---|
| arc | quadrilateral_mesh |
| ellipse | rectangle |
| partial_arc | spline_cone |
| partial_ellipse | spline_sphere |
| partial_polygon2d | spline_surface |
| partial_polygon3d | spline_torus |
| polygon2d | triangular_strip |
| polygon3d | define_trimming_curve |

Additionally, any one of the above primitives which is solid filled and shaded by a light source and has hidden surfaces removed would be considered a three dimensional shaded surface and included in the global database. These are referred to herein as "selected" or "recognized" primitives.

The following primitives which may appear in the display list are ignored during traversal:
all line primitives
all marker primitives
all text primitives
spline curves
all dc primitives
all int primitives
all bit map primitives As illustrated at step 106, each time a recognized primitive is encountered during traversal, its associated attributes are also extracted from the display list ("inquire attributes"). As illustrated at 108, as each recognized primitive is encountered, a bounding volume is constructed in well known fashion. As is known in the art of ray tracing and radiosity, bounding volumes are often simple primitives defined around a surface of complex shape to simplify application of the ray tracing and radiosity algorithms. After the bounding volume for the selected primitive has been defined, data indicative of the selected primitive, its attributes and bounding volume are stored in a global database, as shown at 110. For reasons which will become evident herein after, this global database has been entitled "ray tracing database."

At 112, a determination is made whether rendering will be performed by a radiosity technique. If radiosity has not been selected for rendering, then according to the preferred practice of the invention, it is assumed that rendering will be performed by ray tracing and steps 114, 116 are not performed. Instead, steps 106-110 are repeatedly performed until the display list has been completely traversed and all recognized primitives, associated attributes and bounding volumes have been stored in the global database, as illustrated at 104. Then the functions illustrated at 118 et seq. are performed.

If, at step 112, it was determined that radiosity has been selected for rendering the scene, then, as illustrated at 114, the surfaces defined by each selected primitive are subdivided into smaller surface elements, usually polygons defined by a plurality of vertices. As is known in the art, this is an integral step to application of a radiosity rendering algorithm, and the process of subdividing three dimensional surfaces into surface elements for this purpose is well known.

As illustrated at 116, data defining the surface elements are stored in the global database. For reasons that will become evident herein after, this global database has been entitled the "radiosity database." As before, steps 106-116 are repeatedly performed until the display list has been completely traversed and all recognized primitives, associated attributes, bounding volumes and surface elements have been stored in the global database.

Except as noted, irrespective of whether the rendering is to be performed by ray tracing or radiosity, steps 118 et seq. are preformed after the display list has been completely traversed. As shown at 118, after all recognized primitives have been selected and stored in the global database, data indicative of the camera ("view") and light source descriptions are extracted from the display list and stored in the global database. Construction of the global database is now complete, as illustrated at 120. If, as illustrated at 122, radiosity has not been selected for global rendering, then it is assumed that rendering by ray tracing is to be performed as shown at 124. Any well known ray tracing algorithm may be applied to the global database. It will therefore be appreciated that when ray tracing has been selected as the rendering algorithm, the global database contains only the information shown in FIG. 4A, hence indicating why the term "ray tracing database" was previously employed to characterize the global database. Thus, the ray tracing algorithm is applied to this data to provide a global rendering which is thereafter output to the screen as illustrated at 126. As illustrated at 128, the process is now complete.

If it was determined at step 122 that radiosity was chosen for global rendering, then steps 130-138 are performed. Thus, as shown at 130, any well known radiosity rendering algorithm may be applied to the global database to obtain shading attribute data for each surface element. It will be appreciated that, when radiosity rendering has been selected, the global database contains the data illustrated in FIG. 4B, hence indicating why the term "radiosity database" was previously employed to characterize the global database. Thus, in the case of radiosity rendering, the global database contains the same information as is contained in the ray tracing database, plus data defining the various surface elements, although camera (i.e., view) descriptions are not needed for radiosity rendering. Compare FIGS. 4A and 4B. However, as illustrated in FIG. 4C, after the radiosity algorithm has been applied to the radiosity database, shading attribute data is also stored therein.

As illustrated at 132, after application of the radiosity rendering algorithm to the global database has been completed, the surface element and shading attribute data is retrieved from the global database and output to the graphics system for display as shown at 134. Step 136 illustrates an optional step in the practice of the method of the present invention. If desired, the user may opt to construct a second or alternative display list, display list', from the global (radiosity) database. The alternative display list is constructed from the radiosity database and contains, in conventional display list form, all information needed to render the scene, including the surface element and shading attribute data not previously available. The purpose for constructing the alternative display list is to avoid the need to reperform a radiosity output (step 132) to the global database every time a viewing or attribute change is made, i.e., changes to attributes which are not part of the shading calculation, e.g., edge highlighting. Instead, the user need only make the revision to the alternative display list, then send the graphics data to the graphics system for display on the screen. As shown at 138, once the display (or display list') has been made, the process is complete.

In the case of radiosity, the output to the graphics system is a series of shaded polygons that may be sent either directly for display on the screen or to the alternative display list for further manipulation. In the case of ray tracing, the ray tracing image is output for display on the screen as a full 24 plane bitmap.

The method described above may be implemented as an adjunct program to any three dimensional computer graphics program employing display lists. In the case of Starbase, for example, a mode may be implemented that defines the selected primitives and provides this information to Starbase before traversal; then, Starbase itself may perform the traversal process and select recognized primitives. Associated attributes are obtained using the Starbase "inquire" command. In this embodiment, each time Starbase encounters a recognized primitive during traversal, it would be selected and Starbase would provide the selected primitive or attribute to the adjunct program for processing in the manner hereinabove described. The information may be provided as an array of routine addresses that Starbase can call for the purpose of selecting the recognized primitives.

Commonly, assigned, copending application Ser. No. 332,777, filed Apr. 3, 1989, now Ser. No. 531,377, filed May 31, 1990, entitled "Three Dimensional Computer Graphics Employing Ray Tracing to Compute Form Factors in Radiosity" describes a global rendering method that may be employed in connection with the practice of the present invention. However, it should be understood that the present invention is not limited thereto.

The present invention may be embodied in other specific forms without departing from the spirit or essential attributes thereof and, accordingly, reference should be made to the appended claims rather than to the foregoing specification as indicating the scope of the invention.

We claim:
1. Method comprising the steps of:
   a) providing a hierarchical display list defining a plurality of primitives and attributes of primitives for a three dimensional rendering of a scene, the display list including primitives corresponding to both two dimensional entities and three dimen- sional surfaces in the scene, as well as attributes associated with the primitives;

b) traversing the display list and selecting only the primitives and associated attributes corresponding to the three dimensional surfaces in the scene;

c) storing data indicative of only the selected primitives and attributes associated with the selected primitives in a global database; and, d) rendering the scene by a global illumination technique based upon the data stored in the global database.

2. Method according to claim 1 further comprising the steps of providing light source and view descriptions of the scene in the display list and storing data indicative of the light source and view descriptions in the global database.

3. Method according to claim 1 further comprising the steps of defining a bounding volume around only the selected primitives and storing data indicative of the bounding volumes in the global database.

4. Method according to claim 3 further comprising the steps of defining a plurality of surface elements for each selected primitive and storing data indicative of the surface elements in the global database.

5. Method according to claim 3 wherein step (d) comprises applying a ray tracing algorithm to the data stored in the global database and displaying the rendering.

6. Method according to claim 1 further comprising the steps of defining a plurality of surface elements for each selected primitive and storing data indicative of the surface elements in the global database.

7. Method according to claim 4 further comprising the steps of:

a) determining shading attributes for each surface element by applying a radiosity algorithm to the data stored in the global database and providing data indicative of the shading attributes; and, b) displaying the rendering of the scene based upon the data indicative of the surface elements and the data indicative of the shading attributes.

8. Method according to claim 7 further comprising the step of constructing an alternative display list from the global database, the alternative display list comprising the surface element data and corresponding shading attribute data.

9. Method according to claim 1 wherein step (d) comprises applying a ray tracing algorithm to the data stored in the global database and displaying the rendering.

10. Method according to claim 1 wherein an adjunct program to a three dimensional graphics program stores the data in the global database and defines the primitives to be selected, and the three dimensional graphics program traverses the display list and selects primitives based upon information from the adjunct program.

11. In a three dimensional graphics system employing a display list defining primitives and attributes of primitives corresponding to both two dimensional entities and three dimensional surfaces in a three dimensional scene as well as light source and view descriptions for the three dimensional scene, a method comprising the steps of:

a) traversing the display list and selecting: (i) the light source and view descriptions, (ii) only the primitives corresponding to the three dimensional surfaces in the scene, and (iii) only the attributes associated with the selected primitives;

b) defining a bounding volume around the selected primitives;

c) storing data indicative of (i) the light source and view descriptions, (ii) only the selected primitives and associated attributes, and, (iii) each bounding volume in a global database; and, d) rendering the scene by a global illumination technique based upon the data stored in the global database.

12. Method according to claim 11 wherein the global illumination technique is one of ray tracing or radiosity.

13. Method according to claim 12 further comprising the following steps when the global illumination technique is radiosity:

a) defining a plurality of surface elements for each selected primitive; and, b) storing data indicative of the surface elements in the global database.

14. Method according to claim 13 further comprising the steps of (i) determining shading attributes for each surface element by applying a radiosity algorithm to the data stored in the global database and (ii) displaying the rendering of the scene based upon the data indicative of the surface elements and the data indicative of the shading attributes.

15. Method according to claim 14 further comprising the step of constructing an alternative display list from the global database, the alternative display list comprising the surface element data and corresponding shading attribute data.

16. Method according to claim 11 wherein an adjunct program to a three dimensional graphics program stores the data in the global database and defines the primitives to be selected, and the three dimensional graphics program traverses the display list and selects primitives based upon information from the adjunct program.

17. Three dimensional computer graphics method for global rendering of a three dimensional scene on a display associated with a computer, comprising the steps of:

a) providing in the computer a hierarchical display list comprising model data defining a plurality of primitives and attributes of primitives corresponding to both two dimensional entities and three dimensional surfaces in the scene as well as light source and view descriptions collectively defining the scene to be rendered on the display;

b) selecting between radiosity and ray tracing for the global rendering;

c) traversing the display list and selecting (i) the light source and view descriptions, (ii) only the primitives corresponding to three dimensional surfaces in the scene and (iii) only the attributes associated with the selected primitives;

d) defining a bounding volume around the selected primitives;

e) storing data indicative of (i) the light source and view descriptions, (ii) only the selected primitives and associated attributes, and, (iii) each bounding volume in a global database;

f) applying a ray tracing algorithm to the data stored in the global database only when rendering by ray tracing has been selected and displaying the scene;

g) defining, only when rendering by radiosity has been selected, a plurality of surface elements for each selected primitive and storing data indicative of the surface elements in the global database;

h) applying a radiosity algorithm to the data stored in the global database only when rendering by radiosity has been selected, determining shading attribute data for each surface element, and displaying the scene based upon the surface element and shading attribute data; and, i) constructing an alternative display list from the global database only when radiosity has been selected, the alternative display list comprising the surface element data and corresponding shading attribute data.

18. Method according to claim 17 wherein an adjunct program to a three dimensional graphics program stores the data in the global database and defines the primitives to be selected, and the three dimensional graphics program traverses the display list and selects primitives based upon information from the adjunct program.

* * * * *